US011477851B2

(12) United States Patent
Garner et al.

(10) Patent No.: US 11,477,851 B2
(45) Date of Patent: Oct. 18, 2022

(54) RADIO FREQUENCY REMOTE CONTROL

(71) Applicant: Roku, Inc.

(72) Inventors: Greg Garner, Springdale, AZ (US); Tito Thomas, San Jose, CA (US); Carl Sassenrath, Ukiah, CA (US); Scott De Haas, Austin, TX (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/096,530

(22) Filed: Nov. 12, 2020

(65) Prior Publication Data
US 2022/0151024 A1 May 12, 2022

(51) Int. Cl.
*H04W 88/08* (2009.01)
*G06F 3/16* (2006.01)
*H04N 21/436* (2011.01)
*H04N 21/422* (2011.01)

(52) U.S. Cl.
CPC .......... *H04W 88/085* (2013.01); *G06F 3/165* (2013.01); *H04N 21/42204* (2013.01); *H04N 21/43615* (2013.01)

(58) Field of Classification Search
CPC ...... H04N 21/42204; H04N 21/43615; H04W 88/085; G06F 3/165
See application file for complete search history.

(56) References Cited

U.S. PATENT DOCUMENTS 8,134,453 B2    3/2012  Ootsuka
9,781,721 B1 *  10/2017 Yeh ..................... H04W 72/02
2004/0264600 A1 * 12/2004 Kao ...................... H04B 1/406
                                                        375/316
2006/0093018 A1    5/2006  Chi
2015/0294558 A1 * 10/2015 Huang .................. G08C 17/02
                                                        340/5.61
2016/0014445 A1    1/2016  Belz et al.
2016/0125733 A1    5/2016  Sallas et al.
2017/0373819 A1 * 12/2017 Liu ........................... H04B 1/40

FOREIGN PATENT DOCUMENTS

JP         4409579        2/2010
KR      10-1159182 B1    6/2012

OTHER PUBLICATIONS

International Search Report and Written Opinion of the International Searching Authority directed to related International Patent Application No. PCT/US2021/058574, dated Feb. 23, 2022; 9 pages.

* cited by examiner

*Primary Examiner* — Yassin Alata
(74) *Attorney, Agent, or Firm* — Sterne, Kessler, Goldstein & Fox P.L.L.C.

(57) ABSTRACT

Disclosed herein are system, apparatus, article of manufacture, method, and computer program product embodiments for remotely controlling a media device. An embodiment includes an apparatus including a radio frequency (RF) communications chip, a memory, and at least one processor coupled to the RF communications chip and the memory. The at least one processor is configured to receive an electronic signal indicative of a user command and generate, based on the electronic signal, an action frame packet configured to instruct a media device to perform a function associated with the user command. Subsequently, the at least one processor is configured to transmit, using the RF communications chip, the action frame packet to the media device.

21 Claims, 5 Drawing Sheets

RADIO FREQUENCY REMOTE CONTROL

FIELD

This disclosure is generally directed to radio frequency (RF) remote control devices.

BACKGROUND

In today's world, on-demand availability of content—such as movies, television (TV) shows and music, to name just a few examples—is commonplace. Several commercially available media systems provide such on-demand services. These media systems are controllable using various remote control devices, such as infrared (IR) remote controls, RF remote controls, Wi-Fi remote controls, and Bluetooth (BT) remote controls, to name just a few examples. However, the functionality of and demands on remote control devices have increased substantially through the years, requiring greater computing power and memory usage and increasing the complexity and cost of these devices. For example, traditional RF remote control devices may need to connect to media systems using a Wi-Fi wireless network connection such as Institute of Electrical and Electronics Engineers (IEEE) 802.11ac or 802.11ax and thus require a costly and complex Wi-Fi stack and memory. Further, Wi-Fi protocols typically require multiple digital modulation techniques, from binary phase-shift keying (BPSK) to quadrature amplitude modulation (QAM). As a result, existing RF remote control devices can be complex and costly, require significant computational resources, and result in substantial time for desired functions to be executed by the associated media systems.

SUMMARY

In contrast to conventional remote control devices, the system, apparatus, article of manufacture, method and/or computer program product embodiments, and/or combinations and sub-combinations thereof, described herein solve the above technological problems by using a specialized RF remote control device having a specialized RF communications chip that provides remote control functionality using a significantly reduced set of Wi-Fi functionalities. In an embodiment, the RF remote control device disclosed herein can utilize a minimal set of Wi-Fi protocols needed to interoperate with a conventional Wi-Fi chip (e.g., having a full set of Wi-Fi functionalities) disposed in a media device, TV, set top box, or other Wi-Fi enabled device to substantially reduce the complexity of the disclosed RF remote control device. In one illustrative and non-limiting example, the RF communications chip disclosed herein can utilize Wi-Fi action frames (or, optionally, just a single type of Wi-Fi action frame such as a vendor-specific action frame) and BPSK digital modulation (e.g., because Wi-Fi action frames are transmitted using the lowest rate digital modulation technique, which is BPSK) without supporting other Wi-Fi protocols and thus does not require a costly and complex Wi-Fi stack and memory. For instance, the disclosed RF remote control device can be configured to control a media device by receiving a user command, generating a Wi-Fi action frame (e.g., a vendor-specific action frame) whose payload contains information about the user command (e.g., a string of bits indicative of the user command), and transmitting the Wi-Fi action frame to the media device's Wi-Fi communications chip using BPSK digital modulation. As a result, the disclosed RF remote control device is less complex, less costly, requires substantially less computational resources than conventional remote control devices. In addition, the disclosed RF remote control device decreases the time for desired functions to be executed by the media device.

An embodiment is directed to system, apparatus, article of manufacture, method and/or computer program product embodiments, and/or combinations and sub-combinations thereof, for remotely controlling a media device using an apparatus having a specialized RF communications chip. In a non-limiting embodiment, the apparatus may be an RF remote control device, and the media device may be a smart TV or set top box (STB) having Wi-Fi connectivity, to name just two examples. The apparatus includes an RF communications chip, a memory, and at least one processor coupled to the RF communications chip and the memory. The at least one processor is configured to receive an electronic signal indicative of a user command and generate, based on the electronic signal, an action frame packet configured to instruct a media device to perform a function associated with the user command. Subsequently, the at least one processor is configured to transmit, using the RF communications chip, the action frame packet to the media device.

There are many exemplary aspects to the system, apparatus, article of manufacture, method and/or computer program product embodiments, and/or combinations and sub-combinations thereof, disclosed herein. For example, embodiments of the present disclosure provide for an RF remote control device having a simpler and less costly wireless communications stack. In another example, embodiments of the present disclosure provide for an RF remote control device requiring substantially less (e.g., 50 percent less) computational resources (e.g., memory, computing power) than conventional remote control devices. In one non-limiting illustration of this reduction in required computational resources, the disclosed RF remote control device may reduce on-chip memory requirements from about 384 kilobytes (kB) to less than or about 200 kB. As a result of these and other embodiments described herein, embodiments of the present disclosure provide for an RF remote control device that is substantially faster and cheaper than conventional remote control devices. As a further result of these and other embodiments described herein, embodiments of the present disclosure provide for an RF remote control device that decreases substantially the time for functions to be executed by the media device in response to a user pressing a button on the remote control device.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
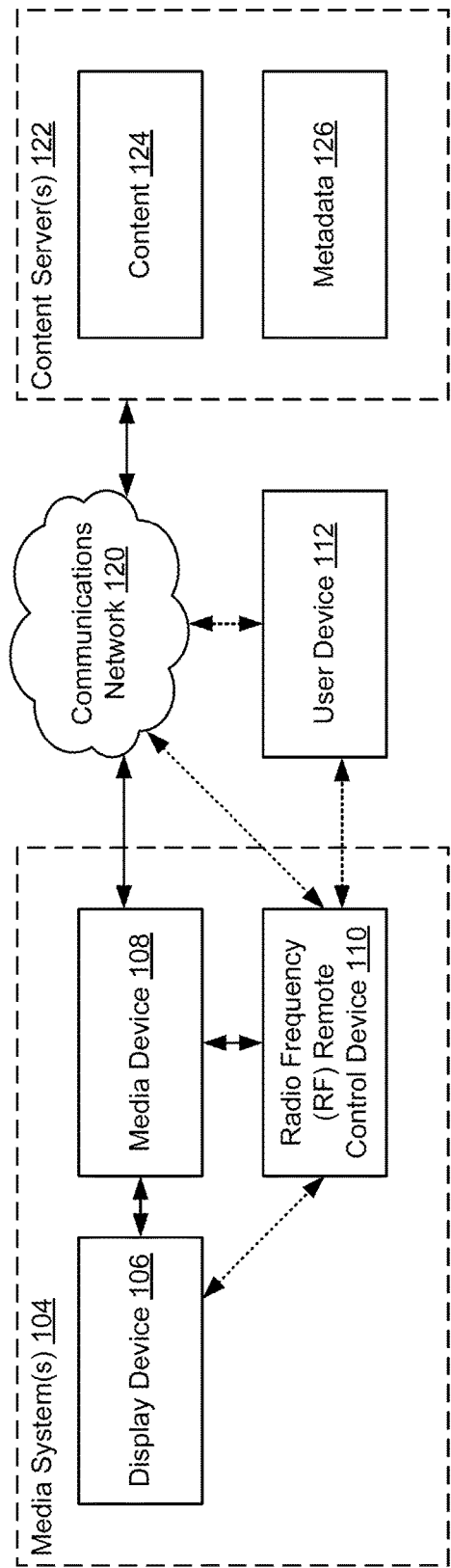
FIG. 1 illustrates a block diagram of a multimedia environment that includes one or more media systems and one or more content servers, according to some embodiments.

FIG. 1 illustrates a block diagram of multimedia environment 102, according to some embodiments. In a non-limiting example, multimedia environment 102 is directed to streaming media.

Multimedia environment 102 may include one or more media systems 104 and one or more content servers 122, communicatively coupled via communications network 120. In various embodiments, communications network 120 can include, without limitation, wired and/or wireless intranet, extranet, Internet, Wi-Fi, RF, IR, cellular, Bluetooth and/or any other near-field, short range, long range, local, regional, global communications network, as well as any combination thereof.

One or more media systems 104 may each include display device 106, media device 108, and RF remote control device 110. Display device 106 may be a monitor, TV, smart TV, computer, smart phone, tablet, and/or projector, to name just a few examples. Media device 108 may be a streaming media device, DVD device, audio/video playback device, cable box, and/or digital video recording device, to name just a few examples. In some embodiments, media device 108 can be a part of, integrated with, operatively coupled to, and/or connected to display device 106. Media device 108 may be configured to communicate with communications network 120. RF remote control device 110 may be configured to communicate with display device 106, media device 108, or any other component of multimedia environment 102 using RF signals, such as Wi-Fi action frame packets.

User device 112 may interact with one or more media systems 104 via RF remote control device 110. RF remote control device 110 can be any component, part, apparatus or method for controlling media device 108 and/or display device 106 using RF communications, such as Wi-Fi action frames (e.g., vendor-specific action frames). For example, RF remote control device 110 may generate control signals (e.g., action frame packets such as vendor-specific action frame packets) corresponding to user commands and transmit the generated control signals to media device 108, display device 106, and/or any other component in multimedia environment 102, to cause that device or component to operate according to the user commands.

One or more content servers 122 (also called one or more content sources) may each include one or more databases to store content 124 and metadata 126. Content 124 may include any combination of music, videos, movies, TV programs, multimedia, images, still pictures, text, graphics, gaming applications, advertisements, software, and/or any other content or data objects in electronic form. In some embodiments, metadata 126 includes data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to content 124. Metadata 126 may also or alternatively include links to any such information pertaining or relating to content 124. Metadata 126 may also or alternatively include one or more indexes of content 124, such as but not limited to a trick mode index.

Figure 2:
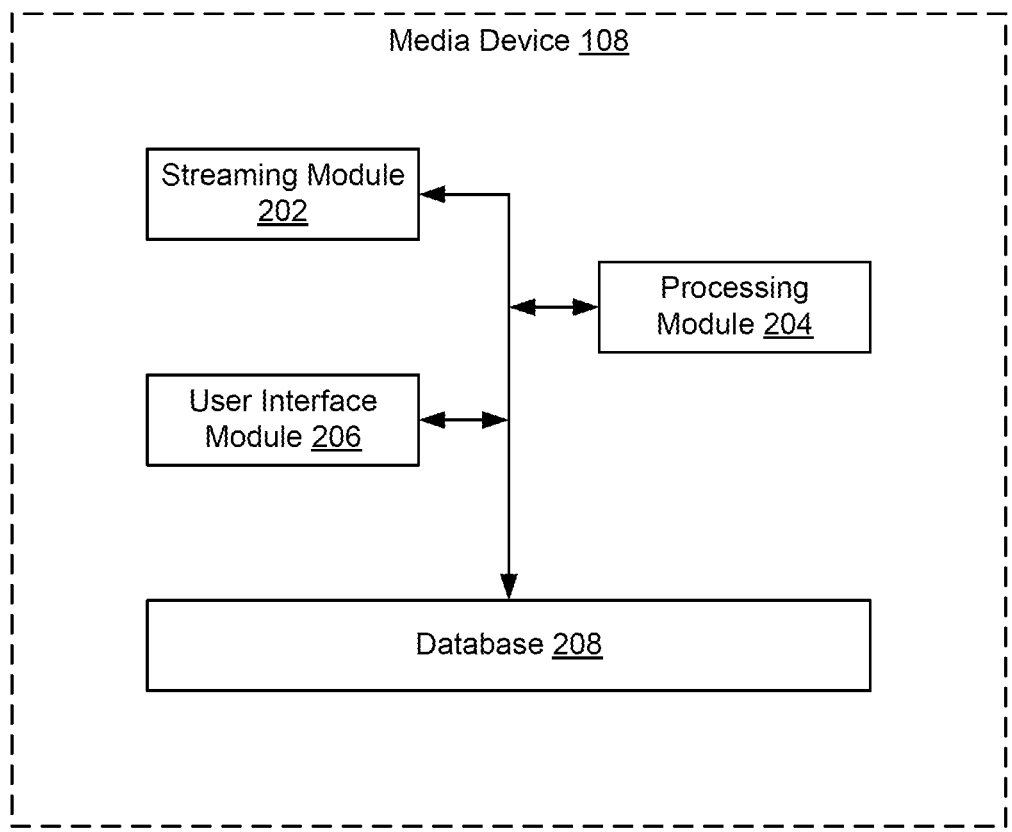
FIG. 2 illustrates a block diagram of a media device, according to some embodiments.

FIG. 2 illustrates an example block diagram of media device 108, according to some embodiments. Media device 108 may include streaming module 202, processing module 204, user interface module 206, and database 208.

Figure 3:
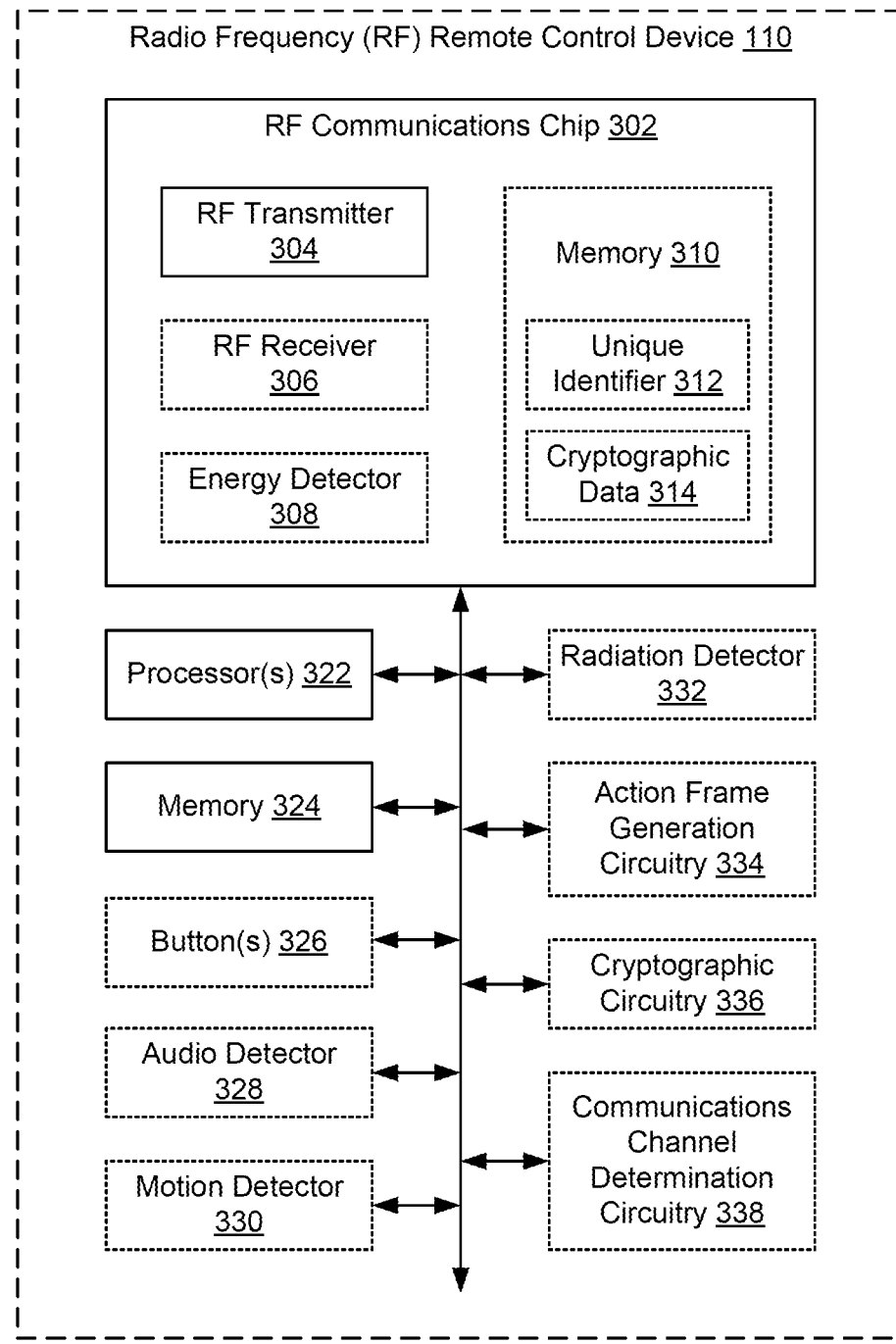
FIG. 3 is a block diagram of an RF remote control device, according to some embodiments.

FIG. 3 illustrates an example block diagram of RF remote control device 110, according to some embodiments. RF remote control device 110 may include RF communications chip 302 (e.g., integrated circuit (IC), application specific IC (ASIC), programmable logic device (PLD), field programmable gate array (FPGA)) including RF transmitter 304, RF receiver 306, energy detector 308, memory 310, any other suitable circuitry or structures, or any combination thereof. Memory 310 may include a unique identifier 312 (e.g., a scalable, preprogrammed 32-bit, 48-bit, 64-bit, 128-bit, 256-bit, or other-bit serial number), cryptographic data 314 (e.g., a key, certificate, secret, or shared secret), any other suitable electronic information, or any combination thereof. RF remote control device 110 may further include one or more processors 322, memory 324, set of buttons 326 (e.g., one or more physical buttons, virtual buttons, soft buttons, touchscreen areas, augmented reality (AR) buttons, virtual reality (VR) buttons, any other suitable buttons, or any combination thereof), audio detector 328 (e.g., microphone, microphone array), motion detector 330 (e.g., accelerometer, gyroscope, motion sensor), radiation detector 332 (e.g., photodetector, infrared (IR) sensor), action frame generation circuitry 334, cryptographic circuitry 336, communications channel determination circuitry 338, any other suitable hardware or software, or any combination thereof.

In some aspects, memory 310 may include volatile memory such as random-access memory (RAM), static RAM (SRAM), dynamic RAM (DRAM), any other suitable volatile memory or data storage structure, or any combination thereof. Additionally or alternatively, memory 310 may include non-volatile memory such as flash memory, read-only memory (ROM), erasable programmable ROM (EPROM), electrically erasable programmable ROM (EEPROM), any other suitable non-volatile memory or data storage structure, or any combination thereof. Further, additionally or alternatively, memory 310 may include one or more registers. In one illustrative and non-limiting example, memory 310 may include less than or about 200 kB of SRAM.

In some aspects, RF communications chip 302 may omit, or reduce the functionality of, one or more of RF receiver 306, energy detector 308, memory 310, unique identifier 312, and cryptographic data 314 to reduce the computational resources, complexity, and cost of RF communications chip 302. In one example, RF communications chip 302 may include RF transmitter 304 but not RF receiver 306, energy detector 308, and memory 310. In another example, RF communications chip 302 may include RF transmitter 304 and memory 310 but not RF receiver 306 and energy detector 308. In another example, RF communications chip 302 may include RF transmitter 304, energy detector 308, and memory 310 but not RF receiver 306. In another example, RF communications chip 302 may include RF transmitter 304, RF receiver 306, and memory 310 but not energy detector 308. In another example, RF communications chip 302 may include RF transmitter 304, RF receiver 306, energy detector 308, and memory 310. In another example, RF communications chip 302 may not include memory 310. In another example, RF communications chip 302 may include memory 310 but not unique identifier 312 and cryptographic data 314. In another example, RF communications chip 302 may include memory 310 and unique identifier 312 but not cryptographic data 314. In another example, RF communications chip 302 may include memory 310 and cryptographic data 314 but not unique identifier 312. In another example, RF communications chip 302 may include memory 310, unique identifier 312, and cryptographic data 314.

In some aspects, RF communications chip 302 may not support all Wi-Fi protocols (e.g., may not be 100 percent Wi-Fi compatible) but rather may support only a subset of Wi-Fi protocols to reduce the computational resources, complexity, and cost of RF communications chip 302. For example, RF communications chip 302 can utilize Wi-Fi action frames to (i) avoid the transmission control protocol (TCP)/Internet protocol (IP) stack and all the IP layer protocol code and (ii) achieve unassociated transfer of data by avoiding some or all the code necessary to perform conventional association, authentication, and encryption (e.g., no handshake needed to pair RF remote control device 110 with media device 108 when transmitting user commands via action frame packets). In one illustrative and non-limiting example, RF communications chip 302 may only support Wi-Fi action frame protocols (e.g., for transmit (TX); or in some embodiments, TX and receive (RX)). In another illustrative and non-limiting example, RF communications chip 302 may only support the Wi-Fi vendor-specific action frame protocol (e.g., as described in IEEE 802.11 section 8.5.6). In another illustrative and non-limiting example, RF communications chip 302 may only support the lowest rate digital modulation technique (e.g., BPSK digital modulation). As a result, RF communications chip 302 may interoperate with full-range Wi-Fi chips (e.g., included in media device 108) without including the costly, complex, and computational resource intensive Wi-Fi stacks and memory associated with those Wi-Fi chips. For example, by doing so, RF communications chip 302 can reduce memory requirements (e.g., memory 310) from about 384 kB to less than about 200 kB of SRAM.

Now referring to FIGS. 1, 2, and 3, in some embodiments, a user may use RF remote control device 110 to interact with user interface module 206 of media device 108 to select content, such as a movie, TV show, music, book, application, game, or other content. Streaming module 202 of media device 108 may request the selected content from one or more content servers 122 over communications network 120. One or more content servers 122 may transmit the requested content to streaming module 202. Media device 108 may transmit the received content to display device 106 for presentation to a user of user device 112. In streaming embodiments, streaming module 202 may transmit the content to display device 106 in real time or near real time as it receives such content from one or more content servers 122. In non-streaming embodiments, media device 108 may buffer or store the content received from one or more content servers 122 in database 208 for later playback on display device 106.

RF remote control device 110 is configured to generate (e.g., by set of buttons 326, audio detector 328, motion detector 330, one or more processors 322, any other suitable circuitry or structures, or any combination thereof) electronic signals indicative of user commands. A user command may correspond to one or more pressed buttons, audio commands, gesture commands, any other suitable commands input, uttered, or motioned by a user, or any combination thereof.

In an embodiment, a user may enter commands on RF remote control device 110 by pressing one or more of set of buttons 326, such as channel up/down, volume up/down, play/pause/stop/rewind/fast forward, menu, up, down, left, right, to name just a few examples. In such a case, the electronic signal indicative of the user command may correspond to a "key_up" signal, a "key_down" signal, a "key_repeat" signal (e.g., when the user holds down a button continuously to scroll), a "key_repeat_stop" signal (e.g., based on a timeout value, such as 10.0 seconds), any other suitable signal, or any combination thereof. In such aspects, set of buttons 326, any circuitry or structures connected thereto, one or more processors 322, or a combination thereof may generate an electronic signal indicative of a button having been pressed by a user in response to the user pressing the button and set of buttons 326, any circuitry or structures connected thereto, one or more processors 322, or a combination thereof detecting a change in an electrical resistance, impedance, or capacitance associated with the pressed button.

Additionally or alternatively, in an embodiment, a user may enter commands on RF remote control device 110 by uttering a command within audible range of audio detector 328. For example, to increase the volume, the user may say "Volume Up." To change to the immediately preceding channel, the user may say "Channel down." In an embodiment, the user may say a trigger word before saying commands, to better enable RF remote control device 110 to distinguish between commands and other spoken words. For example, the trigger word may be "Command." In this case, to increase the volume, the user may say "Command Volume Up." In an embodiment, there may be one or more trigger words that are recognized by RF remote control device 110. In such aspects, one or more processors 322 may generate an electronic signal indicative of an audio command having been spoken by a user in response to the user speaking the audio command and audio detector 328, any circuitry or structures connected thereto, one or more processors 322, or a combination thereof detecting an audio signal associated with the command.

Additionally or alternatively, in an embodiment, a user may enter commands on RF remote control device 110 by making a gesture with RF remote control device 110. For example, to increase the volume, the user may move RF remote control device 110 in an upwards direction. To change to the immediately preceding channel, the user may move RF remote control device 110 in a counter-clockwise direction. In such aspects, one or more processors 322 may generate an electronic signal indicative of a gesture command having been made by a user in response to the user making the gesture command and motion detector 330, any circuitry or structures connected thereto, one or more processors 322, or a combination thereof detecting a movement associated with the command.

Subsequently, RF remote control device 110 may be configured to generate and transmit a Wi-Fi beacon or other Wi-Fi packet type (e.g., non-authenticated and non-encrypted) that contains the information about the user command, such as the key being pressed on RF remote control device 110.

In an embodiment, RF remote control device 110 may be configured to generate (e.g., by action frame generation circuitry 334, one or more processors 322, any other suitable circuitry or structures, or any combination thereof) a Wi-Fi action frame packet based on the electronic signal. The action frame packet may include a payload containing a string of bits indicative of the user command. The action frame packet may be configured to instruct media device 108 to perform a function (e.g., volume up, channel down, menu, etc.) associated with the user command. For example, the action frame packet may be a vendor-specific action frame packet as described in IEEE 802.11 section 8.5.6 and referenced in section 6.3.31. In one illustrative and non-limiting example, the vendor-specific action frame packet may include a category field (e.g., vendor-specific category "127" as specified in IEEE 802.11 Table 8-38; or "126" if management frame protection is negotiated), an organization identifier (e.g., a vendor identifier), and vendor specific content including electronic information (e.g., a string of bits) indicative of the user command. In some aspects, a total size of the action frame packet may be less than or about 100 bits.

In an embodiment, the action frame packet may include unique identifier 312. For example, media device 108 may be located in an area within range of many RF remote control devices (e.g., in a metropolitan apartment complex). In such an embodiment, each RF remote control device 110 may have its own unique identifier 312 built into its RF communications chip 302. Media device 108 may be configured to listen only for communications that include, or are associated with, a particular unique identifier 312, thus avoiding the problem of many remote control devices transmitting signals in a small area. Additionally or alternatively, the action frame packet may include a particular vendor identifier and payload pattern. Media device 108 may be configured to listen only for communications that include that particular vendor identifier and payload pattern.

In an embodiment, RF remote control device 110 may be configured to encrypt (e.g., by cryptographic circuitry 336, one or more processors 322, any other suitable circuitry or structures, or any combination thereof) the action frame packet based on unique identifier 312, cryptographic data 314, any other suitable electronic information, or any combination thereof. RF remote control device 110 may be configured to encrypt the action frame packet using a symmetric cryptographic technique, an asymmetric cryptographic technique, any other well known, suitable cryptographic technique, or any combination thereof. Thereafter, media device 108 may be configured to receive and decrypt the encrypted action frame packet (e.g., based on cryptographic data stored in media device 108) using any well known technologies, and perform the function associated with the user command. In such an embodiment, RF remote control device 110 may be configured not to transmit the unencrypted action frame packet (e.g., the action frame packet may never be transmitted to media device 108).

Thereafter, RF remote control device 110 is configured to transmit, using RF communications chip 302, the action frame packet to media device 108 using the lowest rate Wi-Fi digital modulation technique (e.g., a BPSK digital modulation technique). In one example, each action frame packet may be about 100 bits and thus the RF remote control device 110 may support a BPSK transmission rate of about 1.0 megabits per second (Mbps). As a result, RF remote control device 110 may utilize substantially less airtime per user command than conventional remote control devices.

RF remote control device 110 will now be described with reference to unidirectional (e.g., "one way") and bidirectional (e.g., "two way") communication capabilities.

In some embodiments, RF remote control device 110 may be a unidirectional or "one way" RF remote control device. For example, RF communications chip 302 may omit RF receiver 306 and thus be configured not to receive any communications (e.g., from media device 108).

In an embodiment, RF remote control device 110 may be configured to transmit (e.g., by RF transmitter 304, any other suitable circuitry or structures, or any combination thereof) the action frame packet to media device 108 over two or more communications channels (e.g., frequency bands). For example, RF remote control device 110 may transmit the action frame packet over the two or more communications channels sequentially (e.g., round robin), simultaneously (e.g., blast), near-simultaneously, randomly, or using any other suitable transmission technique. For example, the two or more communications channels may include a 2.4 gigahertz (GHz) communications channel and a 5.0 GHz communications channel. In another example, the two or more communications channels may include all 2.4 GHz communications channels and all 5.0 GHz communications channels. In another example, the two or more communications channels may include all IEEE 802.11ac communications channels. In yet another example, the two or more communications channels may include a subset of IEEE 802.11ax communications channels. In yet another example, the two or more communications channels may include all IEEE 802.11ax communications channels. In still another example, the two or more communications channels may all Wi-Fi communications channels. In an embodiment, RF remote control device 110 may transmit the action frame packet two times per communication channel. In another embodiment, RF remote control device 110 may transmit the action frame packet three times per communication channel.

In an embodiment, RF remote control device 110 may use energy detector 308, communications channel determination circuitry 338, one or more processors 322, any other suitable circuitry or structures, or any combination thereof to determine which Wi-Fi channel media device 108 is communicating on before transmitting the action frame packet to media device 108. For example, RF communications chip 302 may be configured to detect or measure (e.g., by energy detector 308, any other suitable circuitry or structures, or any combination thereof) an energy distribution, such as a received signal strength indicator (RSSI) or a free space energy distribution disposed between RF communications chip 302 and media device 108, indicative of a communications channel used by media device 108. RF remote control device 110 may be configured to determine (e.g., by communications channel determination circuitry, one or more processors 322, any other suitable circuitry or structures, or any combination thereof) a communications channel based on the detected energy distribution. RF remote control device 110 may be configured to transmit (e.g., by RF transmitter 304, any other suitable circuitry or structures, or any combination thereof) the action frame packet to media device 108 over the determined communications channel.

In an embodiment, RF remote control device 110 may use radiation detector 332, communications channel determination circuitry 338, one or more processors 322, any other suitable circuitry or structures, or any combination thereof to determine which Wi-Fi channel media device 108 is on before transmitting the action frame packet to media device 108. For example, radiation detector 332 may be configured to detect a radiation signal indicative of a communications channel used by media device 108. The radiation signal may be a pattern of light or IR flashes emitted by display device 106, or a blinking pattern performed by display device 106, based on a communications channel identification control signal generated by media device 108. RF remote control device 110 may be configured to select (e.g., by communications channel determination circuitry, one or more processors 322, any other suitable circuitry or structures, or any combination thereof) the communications channel based on the detected radiation signal. RF remote control device 110 may be configured to transmit (e.g., by RF transmitter 304, any other suitable circuitry or structures, or any combination thereof) the action frame packet to media device 108 over the selected communications channel.

In an embodiment, RF remote control device 110 may use audio detector 328, communications channel determination circuitry 338, one or more processors 322, any other suitable circuitry or structures, or any combination thereof to determine which Wi-Fi channel media device 108 is on before transmitting the action frame packet to media device 108. In an embodiment, audio detector 328 may be configured to detect an audio signal indicative of a communications channel used by media device 108. The audio signal may be a pattern of sound output or emitted by speakers connected to display device 106 or media device 108 based on a communications channel identification control signal generated by media device 108. RF remote control device 110 may be configured to select (e.g., by communications channel determination circuitry, one or more processors 322, any other suitable circuitry or structures, or any combination thereof) the communications channel based on the detected audio signal. RF remote control device 110 may be configured to transmit (e.g., by RF transmitter 304, any other suitable circuitry or structures, or any combination thereof) the action frame packet to media device 108 over the selected communications channel.

In some embodiments, RF remote control device 110 may be a bidirectional or "two way" RF remote control device. For example, RF communications chip 302 may include RF receiver 306 and thus be configured to receive communications (e.g., from media device 108).

In an embodiment, RF remote control device 110 may use RF receiver 306, communications channel determination circuitry 338, one or more processors 322, any other suitable circuitry or structures, or any combination thereof to determine which Wi-Fi channel media device 108 is on before transmitting the action frame packet to media device 108. For example, RF communications chip 302 may be configured to receive (e.g., by RF receiver 306, any other suitable circuitry or structures, or any combination thereof) a wireless communication (e.g., a wirelessly-transmitted communications channel identification communication or control signal) indicative of a communications channel used by media device 108. For example, the wireless communication may be, or include, an action frame packet (e.g., a vendor-specific action frame packet) whose payload includes a communications channel identifier or identification data indicative of the communications channel used by media device 108. RF remote control device 110 may be configured to select (e.g., by communications channel determination circuitry, one or more processors 322, any other suitable circuitry or structures, or any combination thereof) the communications channel based on the received wireless communication. RF remote control device 110 may be configured to transmit (e.g., by RF transmitter 304, any other suitable circuitry or structures, or any combination thereof) the action frame packet to media device 108 over the selected communications channel.

In an embodiment, RF remote control device 110 and media device 108 may periodically come to a pre-defined frequency on a periodic basis to exchange communications channel identification information, cryptographic information, any other suitable information, or any combination thereof. For example, RF remote control device 110 and media device 108 may periodically come to a 2.4 GHz communications channel every 5, 10, 15, 30, 45, or 60 minutes to exchange communications channel identification information, cryptographic information, any other suitable information, or any combination thereof.

In an embodiment, in response to receiving an action frame packet from RF remote control device 110, media device 108 may generate: an acknowledgement (ACK) signal, frame, or packet; a negative-acknowledgement (NACK) signal, frame, or packet; or any other suitable signal, frame, packet, or data structure. For example, an ACK signal may be indicative of an acknowledgement that media device 108 has received the action frame packet. In another example, a NACK signal may be indicative of an error or that media device 108 has not received the action frame packet. Subsequently, RF communications chip 302 can be configured to receive (e.g., by RF receiver 306, any other suitable hardware or software, or any combination thereof) the ACK signal or NACK signal from media device 108. In one example, in response to receiving an ACK signal, RF communications chip 302 can cease transmission of the action frame packet to media device 108. In another example, in response to receiving a NACK signal, RF communications chip 302 can re-transmit (e.g., by RF transmitter 304, any other suitable hardware or software, or any combination thereof) the action frame packet to media device 108.

Figure 4:
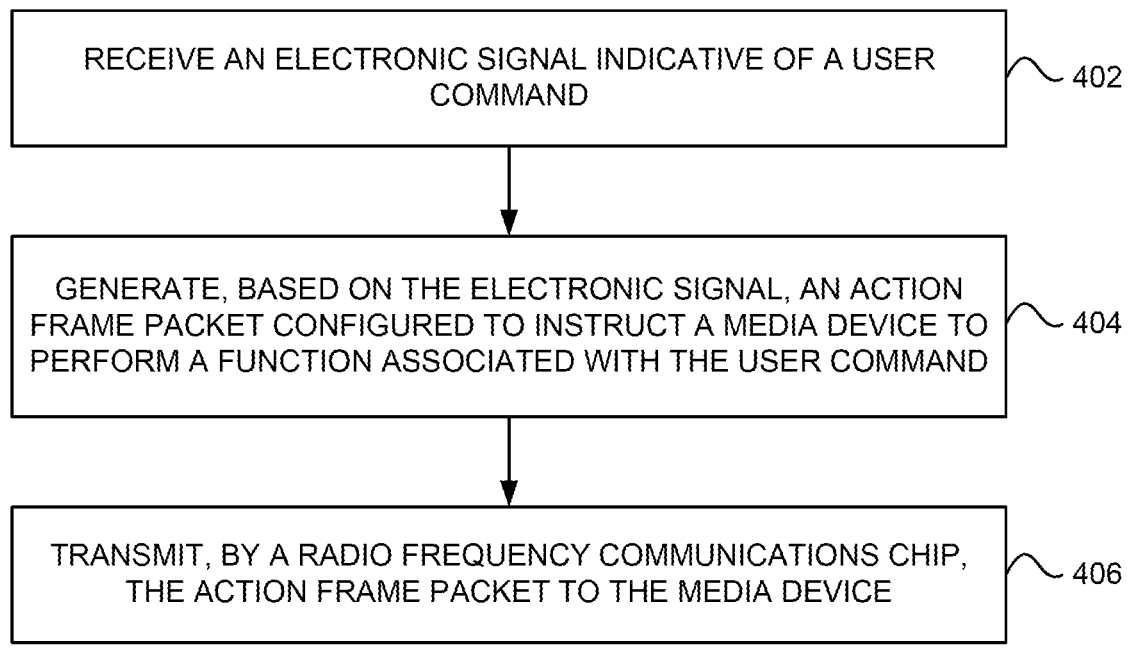
FIG. 4 is a flowchart illustrating a process for remotely controlling a media device, according to some embodiments.

FIG. 4 is a flowchart for a method 400 for remotely controlling a media device, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1 and 3. However, method 400 is not limited to those example embodiments.

In 402, RF remote control device 110 receives (e.g., by one or more processors 322, any other suitable hardware or software, or any combination thereof) an electronic signal indicative of a user command (e.g., a physical or virtual (e.g., touchscreen, AR, VR) button pressed by a user, an audio command spoken by a user, a gesture command motioned by a user, any other suitable user command, or any combination thereof).

In 404, RF remote control device 110 generates (e.g., by one or more processors 322, action frame generation circuitry 334, any other suitable hardware or software, or any combination thereof), based on the received electronic signal, an action frame packet configured to instruct media device 108 to perform a function corresponding to, or associated with, the user command. The action frame packet may be, for example, a vendor-specific action frame packet.

In 406, RF remote control device 110 transmits (e.g., by RF communications chip 302, RF transmitter 304, any other suitable hardware or software, or any combination thereof) the action frame packet to media device 108. For example, RF remote control device 110 may transmit the action frame packet to media device 108 by transmitting the action frame packet to media device 108 over two or more communications channels (e.g., 2.4 GHz and 5.0 GHz; all Wi-Fi communication channels, or a subset thereof). In a set of additional examples, RF remote control device 110 may transmit the action frame packet to media device 108 by transmitting the action frame packet to media device 108 over a communications channel selected by RF remote control device 110 (e.g., using communications channel determination circuitry 338) based on (i) an energy distribution (e.g., RSSI) detected by RF remote control device 110 (e.g., using energy detector 308) and indicative of a communications channel used by media device 108; (ii) a communications channel identification radiation signal detected by RF remote control device 110 (e.g., using radiation detector 332) and indicative of a communications channel used by media device 108; or (iii) a communications channel identification audio signal detected by RF remote control device 110 (e.g., using audio detector 328) and indicative of a communications channel used by media device 108. In yet another example, RF remote control device 110 may transmit the action frame packet to media device 108 by transmitting the action frame packet to media device 108 over a communications channel selected by RF remote control device 110 (e.g., using communications channel determination circuitry 338) based on a wireless communication (e.g., an action frame packet, such as a vendor-specific action frame packet, whose payload includes a communications channel identifier or identification data) received by RF remote control device 110 (e.g., using RF receiver 306) from media device 108 and indicative of a communications channel used by media device 108. Optionally, following 406, media device 108 may receive the action frame packet from RF remote control device 110, determine the function to perform based on the received action frame packet, and perform the function (e.g., volume up, channel down, menu, etc.).

Optionally, following 406, RF remote control device 110 can receive (e.g., by RF communications chip 302, RF receiver 306, any other suitable hardware or software, or any combination thereof), from media device 108, an ACK signal or a NACK signal in response to a transmission of the action frame packet. For example, an ACK signal may be indicative of an acknowledgement that media device 108 has received the action frame packet. In another example, a NACK signal may be indicative of an error or that media device 108 has not received the action frame packet. Optionally, in response to receiving an ACK signal, RF remote control device 110 can cease transmission of the action frame packet to media device 108. Optionally, in response to receiving a NACK signal, RF remote control device 110 can re-transmit (e.g., by RF communications chip 302, RF transmitter 304, any other suitable hardware or software, or any combination thereof) the action frame packet to media device 108.

Figure 5:
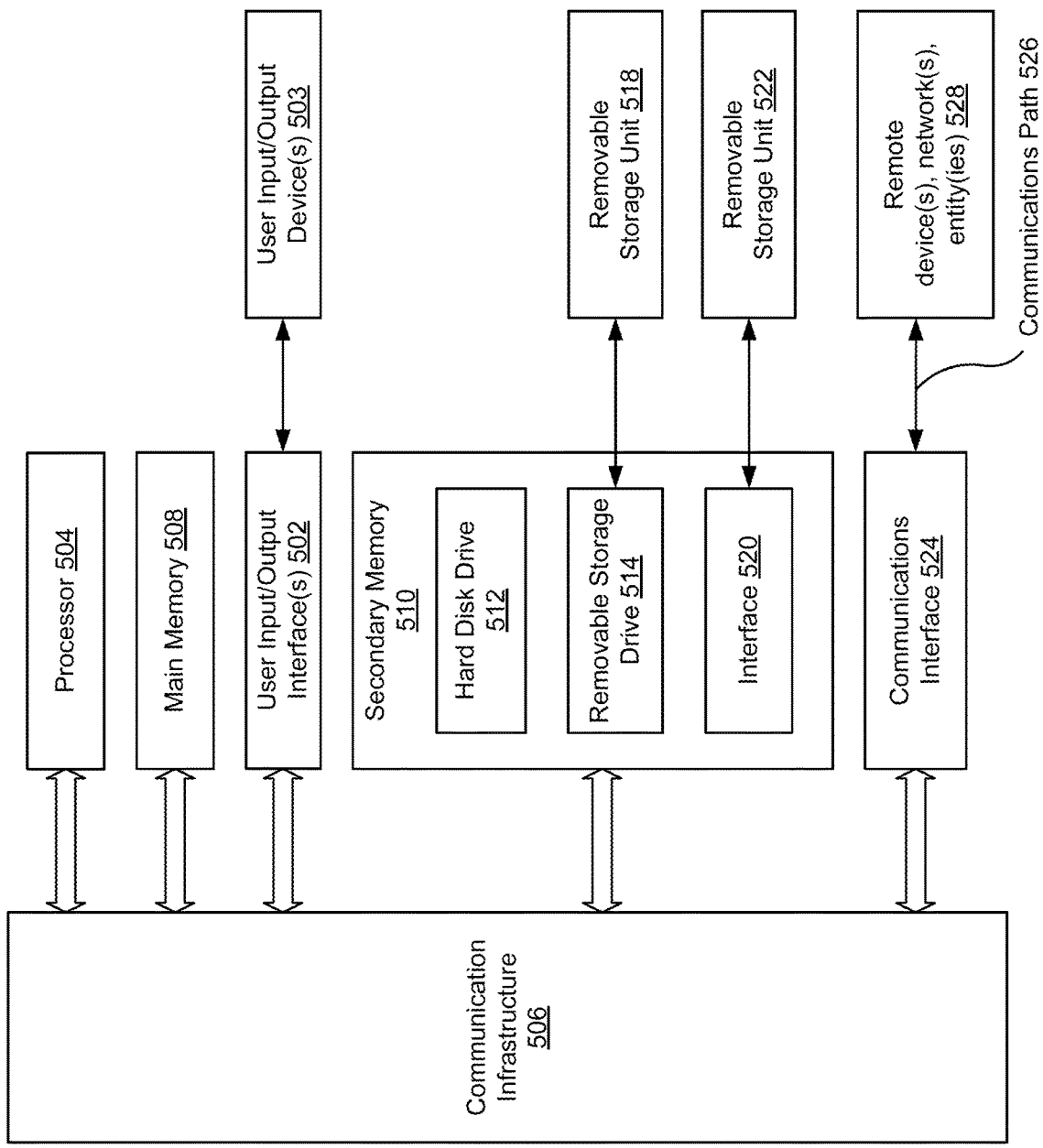
FIG. 5 illustrates an example computer system useful for implementing various embodiments.

Various embodiments and/or components therein can be implemented, for example, using one or more computer systems, such as computer system 500 shown in FIG. 5. Computer system 500 can be any computer or computing device capable of performing the functions described herein. For example, computer system 500 can be used to implement any of the embodiments described herein, as well as combinations and sub-combinations thereof.

Computer system 500 includes one or more processors (also called central processing units, or CPUs), such as processor 504. Processor 504 is connected to communications infrastructure 506 (e.g., a bus).

In some embodiments, processor 504 can be a graphics processing unit (GPU). In some embodiments, a GPU may be a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communications infrastructure 506 through user input/output interface(s) 502.

Computer system 500 also includes main memory 508 (e.g., a primary memory or storage device), such as random access memory (RAM). Main memory 508 can include one or more levels of cache. Main memory 508 may have stored therein control logic (i.e., computer software) and/or data.

Computer system 500 can also include one or more secondary storage devices or memories such as secondary memory 510. Secondary memory 510 can include, for example, hard disk drive 512, removable storage drive 514 (e.g., a removable storage device), or both. Removable storage drive 514 can be a floppy disk drive, a magnetic tape drive, a compact disk drive, an optical storage device, tape backup device, and/or any other storage device/drive.

Removable storage drive 514 can interact with removable storage unit 518. Removable storage unit 518 includes a computer usable or readable storage device having stored thereon computer software (e.g., control logic) and/or data. Removable storage unit 518 can be a floppy disk, magnetic tape, compact disk, DVD, optical storage disk, and/any other computer data storage device. Removable storage drive 514 may read from and/or write to removable storage unit 518.

In some embodiments, secondary memory 510 can include other means, devices, components, instrumentalities or other approaches for allowing computer programs and/or other instructions and/or data to be accessed by computer system 500. Such means, devices, components, instrumentalities or other approaches can include, for example, removable storage unit 522 and interface 520. Examples of removable storage unit 522 and interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communications interface 524 (e.g., a network interface). Communications interface 524 may enable computer system 500 to communicate and interact with any combination of external or remote devices, external or remote networks, remote entities, etc. (individually and collectively referenced by reference number 528). For example, communications interface 524 can allow computer system 500 to communicate with external or remote devices 528 over communications path 526, which can be wired, wireless, or a combination thereof, and which can include any combination of LANs, WANs, the Internet, etc. Control logic and/or data can be transmitted to and from computer system 500 via communications path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards and specifications associated with images, audio, video, streaming (e.g., adaptive bitrate (ABR) streaming, content feeds), high-dynamic-range (HDR) video, text (e.g., closed captioning, subtitles), metadata (e.g., content metadata), data interchange, data serialization, data markup, digital rights management (DRM), encryption, any other suitable function or purpose, or any combination thereof. Alternatively, proprietary data structures, formats or schemas may be used, either exclusively or in combination with another standard or specification.

Standards and specifications associated with images may include, but are not limited to, Base Index Frames (BIF), Bitmap (BMP), Graphical Interchange Format (GIF), Joint Photographic Experts Group (JPEG or JPG), Portable Network Graphics (PNG), any other suitable techniques (e.g., functionally similar representations), any predecessors, successors, and variants thereof, and any combinations thereof.

Standards and specifications associated with audio may include, but are not limited to, Advanced Audio Coding (AAC), AAC High Efficiency (AAC-HE), AAC Low Complexity (AAC-LC), Apple Lossless Audio Codec (ALAC), Audio Data Transport Stream (ADTS), Audio Interchange File Format (AIFF), Digital Theater Systems (DTS), DTS Express (DTSE), Dolby Digital (DD or AC3), Dolby Digital Plus (DD+ or Enhanced AC3 (EAC3)), Dolby AC4, Dolby Atmos, Dolby Multistream (MS12), Free Lossless Audio Codec (FLAC), Linear Pulse Code Modulation (LPCM or PCM), Matroska Audio (MKA), Moving Picture Experts Group (MPEG)-1 Part 3 and MPEG-2 Part 3 (MP3), MPEG-4 Audio (e.g., MP4A or M4A), Ogg, Ogg with Vorbis audio (Ogg Vorbis), Opus, Vorbis, Waveform Audio File Format (WAVE or WAV), Windows Media Audio (WMA), any other suitable techniques, any predecessors, successors, and variants thereof, and any combinations thereof.

Standards and specifications associated with video may include, but are not limited to, Alliance for Open Media (AOMedia) Video 1 (AV1), Audio Video Interleave (AVI), Matroska Video (MKV), MPEG-4 Part 10 Advanced Video Coding (AVC or H.264), MPEG-4 Part 14 (MP4), MPEG-4 Video (e.g., MP4V or M4V), MPEG-H Part 2 High Efficiency Video Coding (HEVC or H.265), QuickTime File Format (QTFF or MOV), VP8, VP9, WebM, Windows Media Video (WMV), any other suitable techniques, any predecessors, successors, and variants thereof, and any combinations thereof.

Standards and specifications associated with streaming may include, but are not limited to, Adaptive Streaming over HTTP, Common Media Application Format (CMAF), Direct Publisher JavaScript Object Notation (JSON), HD Adaptive Streaming, HTTP Dynamic Streaming, HTTP Live Streaming (HLS), HTTP Secure (HTTPS), Hypertext Transfer Protocol (HTTP), Internet Information Services (IIS) Smooth Streaming (SMOOTH), Media RSS (MRSS), MPEG Dynamic Adaptive Streaming over HTTP (MPEG-DASH or DASH), MPEG transport stream (MPEG-TS or TS), Protected Interoperable File Format (PIFF), Scalable HEVC (SHVC), any other suitable techniques, any predecessors, successors, and variants thereof, and any combinations thereof.

Standards and specifications associated with HDR video may include, but are not limited to, Dolby Vision, HDR10 Media Profile (HDR10), HDR10 Plus (HDR10+), Hybrid Log-Gamma (HLG), Perceptual Quantizer (PQ), SL-HDR1, any other suitable techniques, any predecessors, successors, and variants thereof, and any combinations thereof.

Standards and specifications associated with text, metadata, data interchange, data serialization, and data markup may include, but are not limited to, Internet Information Services (IIS) Smooth Streaming Manifest (ISM), IIS Smooth Streaming Text (ISMT), Matroska Subtitles (MKS), SubRip (SRT), Timed Text Markup Language (TTML), Web Video Text Tracks (WebVTT or WVTT), Comma-Separated Values (CSV), Extensible Markup Language (XML), Extensible Hypertext Markup Language (XHTML), XML User Interface Language (XUL), JSON, MessagePack, Wireless Markup Language (WML), Yet Another Markup Language (YAML), any other suitable techniques, any predecessors, successors, and variants thereof, and any combinations thereof.

Standards and specifications associated with DRM and encryption may include, but are not limited to, Advanced Encryption Standard (AES) (e.g., AES-128, AES-192, AES-256), Blowfish (BF), Cipher Block Chaining (CBC), Cipher Feedback (CFB), Counter (CTR), Data Encryption Standard (DES), Triple DES (3DES), Electronic Codebook (ECB), FairPlay, Galois Message Authentication Code (GMAC), Galois/Counter Mode (GCM), High-bandwidth Digital Content Protection (HDCP), Output Feedback (OFB), PlayReady, Propagating CBC (PCBC), Trusted Execution Environment (TEE), Verimatrix, Widevine, any other suitable techniques, any predecessors, successors, and variants thereof, and any combinations thereof, such as AES-CBC encryption (CBCS), AES-CTR encryption (CENC).

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein.

Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. An apparatus, comprising:
   a radio frequency communications chip configured to support only a subset of Wi-Fi protocols comprising Wi-Fi action frame protocols using only one digital modulation technique;
   a memory; and
   at least one processor coupled to the radio frequency communications chip and the memory and configured to:
   receive an electronic signal indicative of a user command;
   generate, based on the electronic signal and the Wi-Fi action frame protocols, a Wi-Fi action frame packet configured to instruct a media device to perform a function associated with the user command while avoiding transmission control protocol (TCP)/Internet protocol (IP) data packets; and
   transmit, using the radio frequency communications chip, the Wi-Fi action frame packet to the media device.

2. The apparatus of claim 1, wherein the Wi-Fi action frame packet is a Wi-Fi vendor-specific action frame packet.

3. The apparatus of claim 1, wherein to transmit the Wi-Fi action frame packet to the media device, the at least one processor is configured to transmit the Wi-Fi action frame packet over two or more communications channels.

4. The apparatus of claim 3, wherein the two or more communications channels comprise a 2.4 gigahertz communications channel and a 5.0 gigahertz communications channel.

5. The apparatus of claim 1, wherein:
   the radio frequency communications chip is further configured to:
   detect an energy distribution disposed between the radio frequency communications chip and the media device; and
   to transmit the Wi-Fi action frame packet to the media device, the at least one processor is configured to:
   determine a communications channel based on the detected energy distribution; and
   transmit, using the radio frequency communications chip, the Wi-Fi action frame packet to the media device over the determined communications channel.

6. The apparatus of claim 1, further comprising:
   a radiation detector configured to:
   detect a radiation signal indicative of a communications channel used by the media device;
   wherein to transmit the Wi-Fi action frame packet to the media device, the at least one processor is configured to:
   select the communications channel based on the detected radiation signal; and
   transmit, using the radio frequency communications chip, the Wi-Fi action frame packet to the media device over the selected communications channel.

7. The apparatus of claim 1, further comprising:
   an audio detector configured to:
   detect an audio signal indicative of a communications channel used by the media device;
   wherein to transmit the Wi-Fi action frame packet to the media device, the at least one processor is configured to:
   select the communications channel based on the detected audio signal; and
   transmit, using the radio frequency communications chip, the Wi-Fi action frame packet to the media device over the selected communications channel.

8. The apparatus of claim 1, wherein:
   the radio frequency communications chip is further configured to:
   receive, from the media device, an acknowledgement signal in response to a transmission of the Wi-Fi action frame packet.

9. The apparatus of claim 1, wherein:
   the radio frequency communications chip is further configured to:
   receive a wireless communication indicative of a communications channel used by the media device; and
   to transmit the Wi-Fi action frame packet to the media device, the at least one processor is configured to:
   select the communications channel based on the received wireless communication; and
   transmit, using the radio frequency communications chip, the Wi-Fi action frame packet to the media device over the selected communications channel.

10. The apparatus of claim 1, wherein the at least one processor is configured to:
    generate, based on the Wi-Fi action frame packet, an encrypted Wi-Fi action frame packet; and
    transmit, using the radio frequency communications chip, the encrypted Wi-Fi action frame packet to the media device, wherein the Wi-Fi action frame packet is never transmitted to the media device.

11. A remote control device for remotely controlling a media device, comprising:
a radio frequency communications chip configured to support only a subset of Wi-Fi protocols comprising Wi-Fi action frame protocols using only one digital modulation technique;
a memory; and
at least one processor coupled to the radio frequency communications chip and the memory and configured to:
receive an electronic signal indicative of a user command;
generate, based on the electronic signal and the Wi-Fi action frame protocols, a Wi-Fi action frame packet configured to instruct the media device to perform a function associated with the user command while avoiding transmission control protocol (TCP)/Internet protocol (IP) data packets; and
transmit, using the radio frequency communications chip, the Wi-Fi action frame packet to the media device.

12. The remote control device of claim 11, wherein the Wi-Fi action frame packet is a Wi-Fi vendor-specific action frame packet.

13. The remote control device of claim 11, wherein to transmit the Wi-Fi action frame packet to the media device, the at least one processor is configured to transmit the Wi-Fi action frame packet over two or more communications channels.

14. The remote control device of claim 11, wherein:
the radio frequency communications chip is further configured to:
detect an energy distribution disposed between the radio frequency communications chip and the media device; and
to transmit the Wi-Fi action frame packet to the media device, the at least one processor is configured to:
determine a communications channel based on the detected energy distribution; and
transmit, using the radio frequency communications chip, the Wi-Fi action frame packet to the media device over the determined communications channel.

15. The remote control device of claim 11, further comprising:
a radiation detector configured to:
detect a radiation signal indicative of a communications channel used by the media device;
wherein to transmit the Wi-Fi action frame packet to the media device, the at least one processor is configured to:
select the communications channel based on the detected radiation signal; and
transmit, using the radio frequency communications chip, the Wi-Fi action frame packet to the media device over the selected communications channel.

16. The remote control device of claim 11, further comprising:
an audio detector configured to:
detect an audio signal indicative of a communications channel used by the media device;
wherein to transmit the Wi-Fi action frame packet to the media device, the at least one processor is configured to:
select the communications channel based on the detected audio signal; and
transmit, using the radio frequency communications chip, the Wi-Fi action frame packet to the media device over the selected communications channel.

17. The remote control device of claim 11, wherein:
the radio frequency communications chip is further configured to:
receive, from the media device, an acknowledgement signal in response to a transmission of the Wi-Fi action frame packet.

18. The remote control device of claim 11, wherein:
the radio frequency communications chip is further configured to:
receive a wireless communication indicative of a communications channel used by the media device; and
to transmit the Wi-Fi action frame packet to the media device, the at least one processor is configured to:
select the communications channel based on the received wireless communication; and
transmit, using the radio frequency communications chip, the Wi-Fi action frame packet to the media device over the selected communications channel.

19. A computer-implemented method for remotely controlling a media device, comprising:
receiving, by at least one processor coupled to a radio frequency communications chip configured to support only a subset of Wi-Fi protocols comprising Wi-Fi action frame protocols using only one digital modulation technique, an electronic signal indicative of a user command;
generating, by the at least one processor based on the electronic signal and the Wi-Fi action frame protocols, a Wi-Fi action frame packet configured to instruct the media device to perform a function associated with the user command while avoiding transmission control protocol (TCP)/Internet protocol (IP) data packets; and
transmitting, by the radio frequency communications chip, the Wi-Fi action frame packet to the media device.

20. The computer-implemented method of claim 19, wherein the Wi-Fi action frame packet is a Wi-Fi vendor-specific action frame packet.

21. An apparatus, comprising:
a reduced-functionality radio frequency communications chip configured to support Wi-Fi action frame protocols using only one digital modulation technique;
a memory; and
at least one processor coupled to the reduced-functionality radio frequency communications chip and the memory and configured to:
receive an electronic signal indicative of a user command;
generate, based on the electronic signal and the Wi-Fi action frame protocols, a Wi-Fi action frame packet configured to instruct a media device to perform a function associated with the user command while avoiding transmission control protocol (TCP)/Internet protocol (IP) data packet; and
transmit, using the reduced-functionality radio frequency communications chip, the Wi-Fi action frame packet to the media device.

* * * * *